US011007852B2

(12) United States Patent
Wilson, III et al.

(10) Patent No.: US 11,007,852 B2
(45) Date of Patent: May 18, 2021

(54) SUNSHADE FOR A VEHICLE, A VEHICLE INCLUDING A SUNSHADE, AND A FRAME AND SUNSHADE ASSEMBLY

(71) Applicant: Honda Motor Co., Ltd., Tokyo (JP)

(72) Inventors: Robert T. Wilson, III, Delaware, OH (US); Samira S. Johnson, Raymond, OH (US); Sebastian Osorio, Columbus, OH (US); Ryan J. Holoweiko, Ostrander, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 196 days.

(21) Appl. No.: 16/527,821

(22) Filed: Jul. 31, 2019

(65) Prior Publication Data

US 2021/0031598 A1     Feb. 4, 2021

(51) Int. Cl.
*B60J 3/00*     (2006.01)
*B60R 21/13*    (2006.01)

(52) U.S. Cl.
CPC .............. *B60J 3/002* (2013.01); *B60R 21/13* (2013.01)

(58) Field of Classification Search
CPC ....... B60J 7/10; B60J 11/04; B60J 1/02; B60J 5/08; B60J 7/104; B60J 7/1291; B60J 1/20; B60J 1/2013; B60J 5/0487; B60J 7/085; B60R 21/13; B60R 21/06
USPC ........ 296/97.9, 102, 136.03, 107.09, 136.12, 296/84.1, 107.01, 107.11; 604/101.05, 604/103.03, 913, 919
See application file for complete search history.

(56) References Cited

U.S. PATENT DOCUMENTS

| 6,338,522 | B1 | 1/2002 | LeBlanc |
| 7,213,866 | B2 | 5/2007 | Metts et al. |
| 8,308,223 | B2 | 11/2012 | King |
| 8,714,591 | B1* | 5/2014 | Kobayashi ............... F16B 2/08 280/749 |
| 8,888,163 | B1 | 11/2014 | Johnson |
| 8,944,486 | B2 | 2/2015 | Donohoe |
| 9,950,598 | B2 | 4/2018 | Stickles et al. |
| 2001/0033084 | A1* | 10/2001 | Murray ................. B60J 1/2011 296/24.46 |
| 2007/0018485 | A1 | 1/2007 | Jacobson |
| 2011/0241325 | A1 | 10/2011 | King et al. |
| 2014/0306487 | A1* | 10/2014 | Dobrot ................... B60J 5/0487 296/190.03 |

(Continued)

OTHER PUBLICATIONS

Alien Sunshade "Sunshades for your 2-Door Jeep (2007-2018) JK" https://www.aliensunshade.com/collections/shades-for-jeep-wrangler-2-door-and-4-door-2007-2017.

(Continued)

*Primary Examiner* — D Glenn Dayoan
*Assistant Examiner* — Sunsurraye Westbrook
(74) *Attorney, Agent, or Firm* — Kenealy Vaidya LLP

(57) ABSTRACT

A frame and sunshade assembly for a vehicle having a passenger space configured in a side-by-side seating arrangement can include a plurality of frame members connected together to define an area above the passenger space when the frame members are mounted on the vehicle, a flexible panel extending along the area, and a plurality of anchors connected to the flexible panel. Each of the anchors can be mounted onto a respective one of the frame members. The anchors can include a first flexible strap, a second elastic strap, a pair of D-ring assemblies, and a fourth elastic strap.

20 Claims, 9 Drawing Sheets

(56) References Cited

U.S. PATENT DOCUMENTS

2015/0175114 A1\* 6/2015 Schroeder .............. B60J 5/0487
                                                        296/190.03

OTHER PUBLICATIONS

Bestop "Bikini Tops" https://www.bestop.com/bikini-tops/.
Dirty Dog 4×4 "Sun Screens" https://store.dirtydog4x4.com/sun_screens.
JTopsUSA "2018 Wrangler JL 2 and 4 Door Sun Shade" https://www.jtopsusa.com/wrangler-jl-sun-shade.
Smittybilt "Mesh Extended Top" https://www.smittybilt.com/product/index/225.htm.
Spidershade "TJkini" https://www.spiderwebshade.com/collections/sw1tj/products/tjkini-1.
Spidershade "YJkini" https://www.spiderwebshade.com/collections/yj/products/yjkini.

\* cited by examiner

SUNSHADE FOR A VEHICLE, A VEHICLE INCLUDING A SUNSHADE, AND A FRAME AND SUNSHADE ASSEMBLY

BACKGROUND

The disclosed subject matter relates to a sunshade for a vehicle. More particularly, the disclosed subject matter relates to methods and apparatus that can secure a sunshade to a frame assembly of a vehicle.

Vehicles configured for use on unimproved paths, such as but not limited to gravel paths, dirt trails, and unmarked paths can include an open frame assembly that includes a plurality of pipes, tubes or similar structures that are connected together to extend around and above a passenger space. This open frame assembly can provide or enhance a passenger's perception of an open passenger space. The open frame assembly can also provide protection to the passengers from various driving and environmental conditions. The open frame assembly can also be referred to as a rollover protection structure.

SUMMARY

Some embodiments are directed to a sunshade for a vehicle including a passenger space, a center frame member, a front crossbar, a rear crossbar, a center crossbar, a first side bar, and a second side bar, the crossbars and the side bars connected together and extending around the passenger space. The sunshade can include a flexible panel, a middle anchor, a front anchor, a first side anchor, a rear anchor, and a second side anchor. The flexible panel can be configured to extend across an area bounded by the front crossbar, the rear crossbar, the first side bar and the second side bar. The flexible panel can include a front end, a rear end opposing the front end, and an intermediate portion located between the front end and the rear end. The middle anchor can be connected to the intermediate portion of the flexible panel and configured to be bolted onto the center crossbar. The front anchor can be configured to be bolted onto the front crossbar. The front anchor can include a front elastic member connected to the flexible panel. The first side anchor can be configured to be mounted onto the first side bar. The first side anchor can include a first D-ring assembly connected to the flexible panel. The rear anchor can be configured to be bolted onto the rear crossbar. The rear anchor can include a rear elastic member connected to the flexible panel. The second side anchor can be configured to be mounted onto the second side bar. The second side anchor can include a second D-ring assembly connected to the flexible panel. The front elastic member and the rear elastic member can be configured to apply tension to the flexible panel when the flexible panel is mounted onto each of the center crossbar, the front crossbar, rear crossbar, first side bar, and second side bar.

Some embodiments are directed to an off-road vehicle including a passenger space, a rollover protection structure and a sunshade. The passenger space can include at least a first seat and a second seat arranged side-by-side in a transverse direction of the vehicle. The rollover protection structure can surround the passenger space and include a front crossbar, a rear crossbar, a center crossbar, a first side bar and a second side bar. The front crossbar can extend along the transverse direction of the vehicle. The rear crossbar can extend along the transverse direction of the vehicle and be spaced away from the front crossbar along a longitudinal direction of the vehicle. The center crossbar can extend along the transverse direction of the vehicle and be located between the front crossbar and the rear crossbar. The first side bar can extend along the longitudinal direction of the vehicle. The first side bar can be connected to each of the front, rear and center crossbars. The second side frame member can extend along the longitudinal direction of the vehicle. The second side bar can be spaced away from the first side frame member in the transverse direction of the vehicle. The second side bar can be connected to each of the front, rear and center crossbars. The sunshade can cover an area that overlaps the passenger space and include a flexible panel, a middle anchor, a front anchor, a first side anchor, a rear anchor and a second side anchor. The flexible panel can be configured to extend along an area bounded by the rollover protection structure. The flexible panel can include a front end extending along the transverse direction of the vehicle, a rear end extending along the transverse direction of the vehicle and spaced away from the front end in the longitudinal direction of the vehicle, a first side extending from and connected to each of the front end and the rear end, and a second side extending from and connected to each of the front end and the rear end. The middle anchor can be connected to the flexible panel at a location that is spaced away from each of the front end and the rear end of the flexible panel. The middle anchor can be bolted onto the center frame member. The front anchor can be bolted onto the front frame member. The front anchor can include a front elastic member connected to the flexible panel. The first side anchor can be mounted onto the first side frame member. The first side anchor can include a first D-ring assembly connected to the first side of the flexible panel. The rear anchor can be bolted onto the rear frame member. The rear anchor can include a rear elastic member connected to the flexible panel. The second side anchor can be mounted onto the second side frame member. The second side anchor can include a second D-ring assembly connected to the flexible panel. The front elastic member and the rear elastic member can apply tension to the flexible panel.

Some embodiments are directed to a frame and sunshade assembly for a vehicle having a passenger space configured in a side-by-side seating arrangement can include a plurality of frame members connected together to define an area above the passenger space when the frame members are mounted on the vehicle, a flexible panel extending along the area, and a plurality of anchors connected to the flexible panel. Each of the anchors can be mounted onto a respective one of the frame members. The anchors can include a first flexible strap, a second elastic strap, a pair of D-ring assemblies, and a fourth elastic strap.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Vehicles with an open frame assembly might not include a roof that extends above a passenger space. As a result, the passengers can be exposed to the conditions of the ambient environment such as sunlight, rain, etc. Although a solid roof can be secured to the open frame assembly, a solid roof can adversely affect a passenger's perception of an open passenger space. Thus, it is desirable to provide a structure that can at least partially shield one or more passengers of a vehicle from one or more ambient conditions, while simultaneously providing the passenger(s) with sense of an open passenger space.

Figure 1:
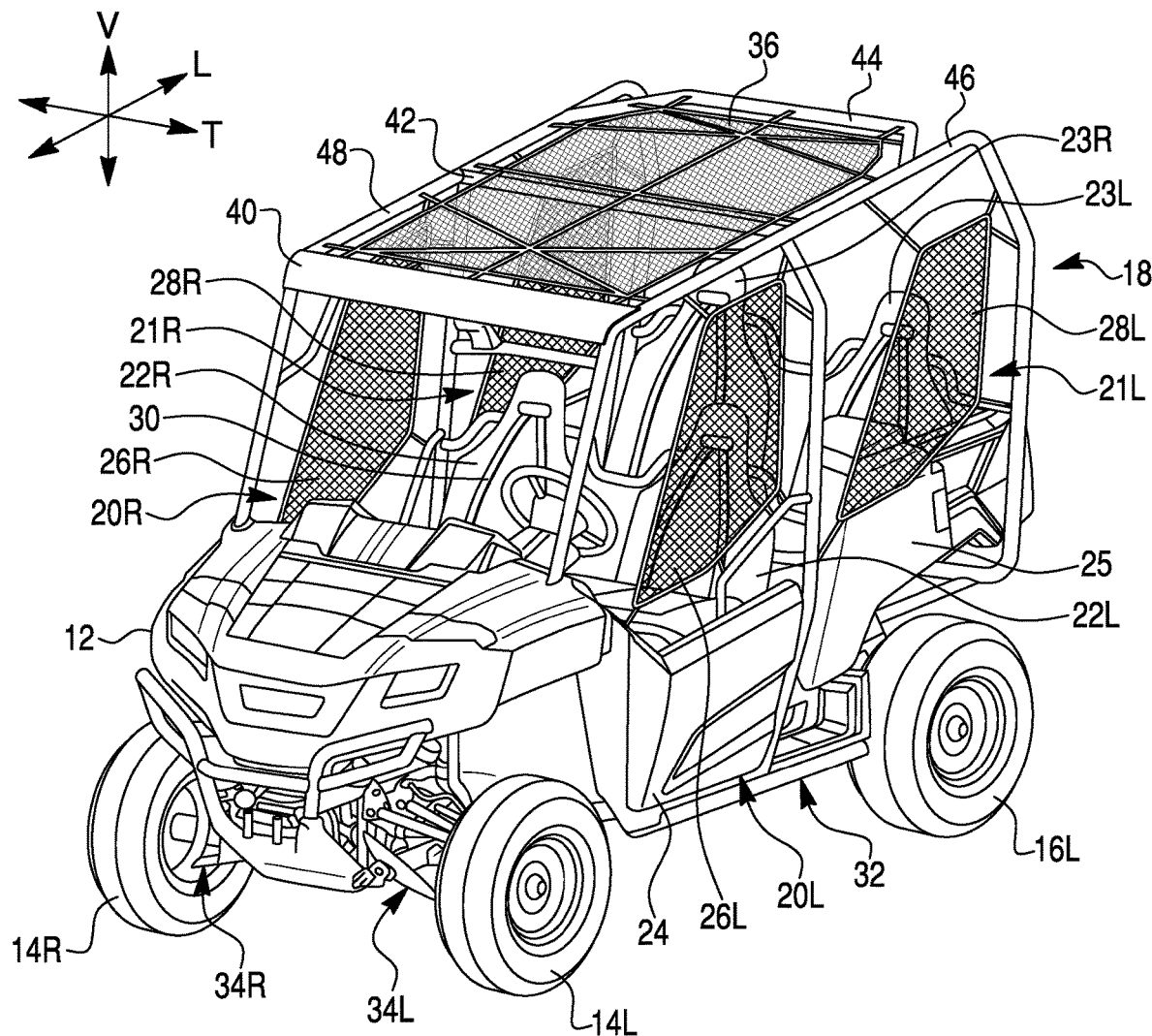
FIG. 1 is a perspective view of an exemplary vehicle including a frame and sunshade assembly in accordance with the disclosed subject matter.

FIG. 1 illustrates an embodiment of a vehicle 10 that can include a frame and sunshade assembly made in accordance with principles of the disclosed subject matter. The sunshade can be semi-opaque to the ambient sunlight and semi-transparent to the passenger(s) viewpoint such that the sunshade can provide a predetermined level of protection from sunlight, while also providing the passenger(s) with the ability to perceive an open passenger space.

The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV). However, the disclosed frame and sunshade assembly can be used with any vehicle that is configured for travel along any one or combination of improved, unimproved, and unmarked paths. For example, embodiments are intended to include or otherwise cover any type of vehicle or automobile, including a passenger car, minivan, truck, tractor, boat, other types of all-terrain vehicles (ATV), semi-tractor, off-highway vehicle, etc. For example, embodiments can include or otherwise cover configurations of the frame and sunshade assembly for use in still other types of vehicles, such as an autonomous wheeled vehicle, a non-motorized wheeled vehicle, a continuous tracked vehicle, etc.

The vehicle 10 can include a body 12, a pair of front wheels 14L, 14R, a pair of rear wheels 16L, 16R, a rollover protection structure 18, a pair of front door assemblies 20L, 20R, a pair of rear door assemblies 21L, 21R, a frame assembly 32, a pair of front suspension assemblies 34L, 34R, a pair of rear suspension assemblies and a powertrain. The right rear wheel 16R, the rear suspension assemblies and the powertrain are hidden from view in FIG. 1 by the body 12. The frame assembly 32 can include the rollover protection structure 18. As will be discussed in detail below, a sunshade 36 can be connected to the frame 32 at the rollover protection structure 18 and can cover an area above a passenger space.

The vehicle 10 can include a pair of front seats 22L, 22R and a pair of rear seats 23L, 23R mounted in a passenger space of the vehicle 10. The front seats 22L, 22R can be arranged side-by-side in a transverse direction T of the vehicle 10. The rear seats 23L, 23R can be arranged side-by-side in a transverse direction T of the vehicle 10. The rear seats 23L, 23R can be spaced behind the front seats 221L, 21R in a longitudinal direction L of the vehicle 10.

The rollover protection structure 18 can be configured to extend around the seats 22L, 22R, 23L, 23R and the passenger space. The rollover protection structure 18 can extend above the seats 22L, 22R, 23L, 23R in a vertical direction V of the vehicle 10. The rollover protection structure 18 can cooperate with the body 12 and/or at least a portion of the frame assembly 32 to define a pair of door openings through which a passenger may pass in order to enter or exit the passenger area.

The front door assemblies 20L, 20R can each include a door 24 and a front window panel assembly 26L, 26R, and can be configured to selectively open and close access through the door openings by moving between a closed position and a fully opened position. The rear door assemblies 21L, 21R can each include a door 25 and a rear window panel assembly 28L, 28R, and can be configured to selectively open and close access through the door openings by moving between a closed position and a fully opened position. In the closed position, the door assemblies 20L, 20R, 21L, 21R can span the respective door openings to obstruct access to the passenger area via the door openings. In the closed position, the front portion of each door assembly 20L, 20R, 21L, 21R can be latched to the rollover protection structure 18. The fully opened position can be any position where the door assemblies 20L, 20R, 21L, 21R are pivoted away from the respective door openings to provide substantially unobstructed access to the passenger area via the door openings. FIG. 1 shows the door assemblies 20L, 20R, 21L, 21R in the closed position. The exemplary window panel assemblies 26L, 26R, 28L, 28R are illustrated to include a mesh or net panel. However, embodiments are intended to include or otherwise cover window panel assemblies that include a transparent or semi-transparent panel.

Each seat 22L, 22R, 23L, 23R of the vehicle 10 also can include a seat belt assembly 30, and/or other structures that may be relevant or beneficial.

Figure 2:
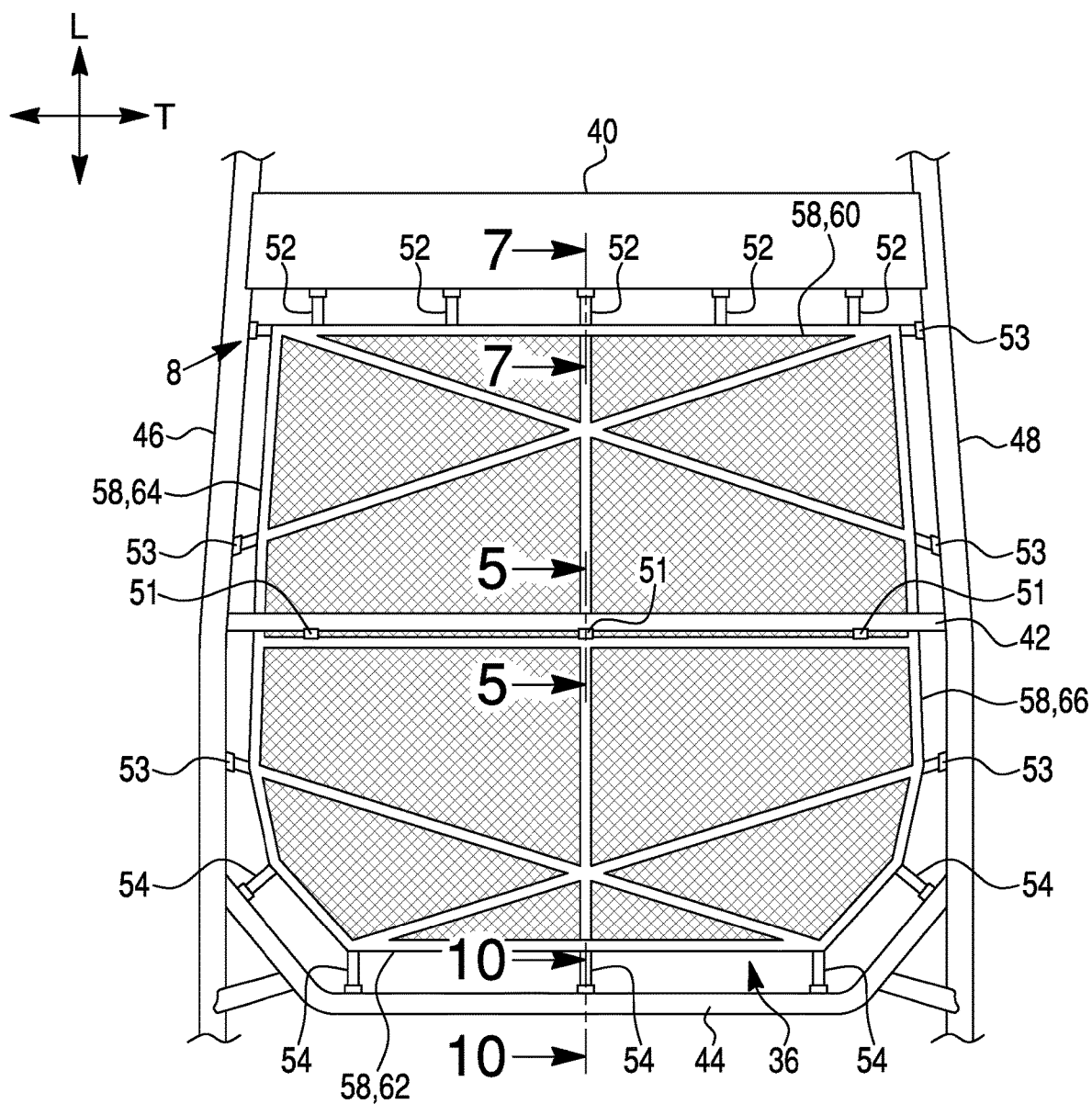
FIG. 2 is a plan view of the exemplary frame and sunshade assembly of the vehicle of FIG. 1.

FIG. 2 shows a plan view of a frame and sunshade assembly 38. The frame and sunshade assembly 38 can include the sunshade 36 and a plurality of frame members 40, 42, 44, 46, 48. Referring to FIGS. 1 and 2, the frame members 40, 42, 44, 46, 48 can be connected to together and extend around the passenger space. The sunshade 36 can extend along an area bounded by the frame members 40, 44, 46, 48. The frame members 40, 42, 44, 46, 48 can be spaced above the seats 22L, 22R, 23L, 23R in the vertical direction of the vehicle 10. The frame members 40, 42, 44, 46, 48 can be made from any appropriate material such as but not limited to metal. The frame members 40, 42, 44, 46, 48 can have any appropriate cross-sectional shape such as but not limited to a hollow cylindrical tube. The frame members 40, 42, 44, 46, 48 can be straight, curved or a combination of one or more curved and straight portions.

The frame members 40, 42, 44, 46, 48 can be part of the rollover protection structure 18. For example, the rollover protection structure 18 can include the frame member 40 configured as a front crossbar, the frame member 42 configured as a center crossbar, the frame member 44 configured as a rear crossbar, the frame member 46 configured as a first side bar and the frame member 48 configured as a second side bar. The crossbars 40, 42, 44 can extend along and parallel with the transverse direction T of the vehicle 10. The side bars 46, 48 can extend along and parallel with the longitudinal direction L of the vehicle 10. The center crossbar 42 can be located between the front crossbar 40 and the rear crossbar 44 in the longitudinal direction L of the vehicle 10. The first side bar 46 can be connected to and extend from each of the front, center and rear crossbars 40, 42, 44. The second side bar 48 can be spaced away from the first side bar 46 in the transverse direction of the vehicle. The second side bar 48 can be connected to and extend from each of the front, center and rear crossbars 40, 42, 44.

Figure 3:
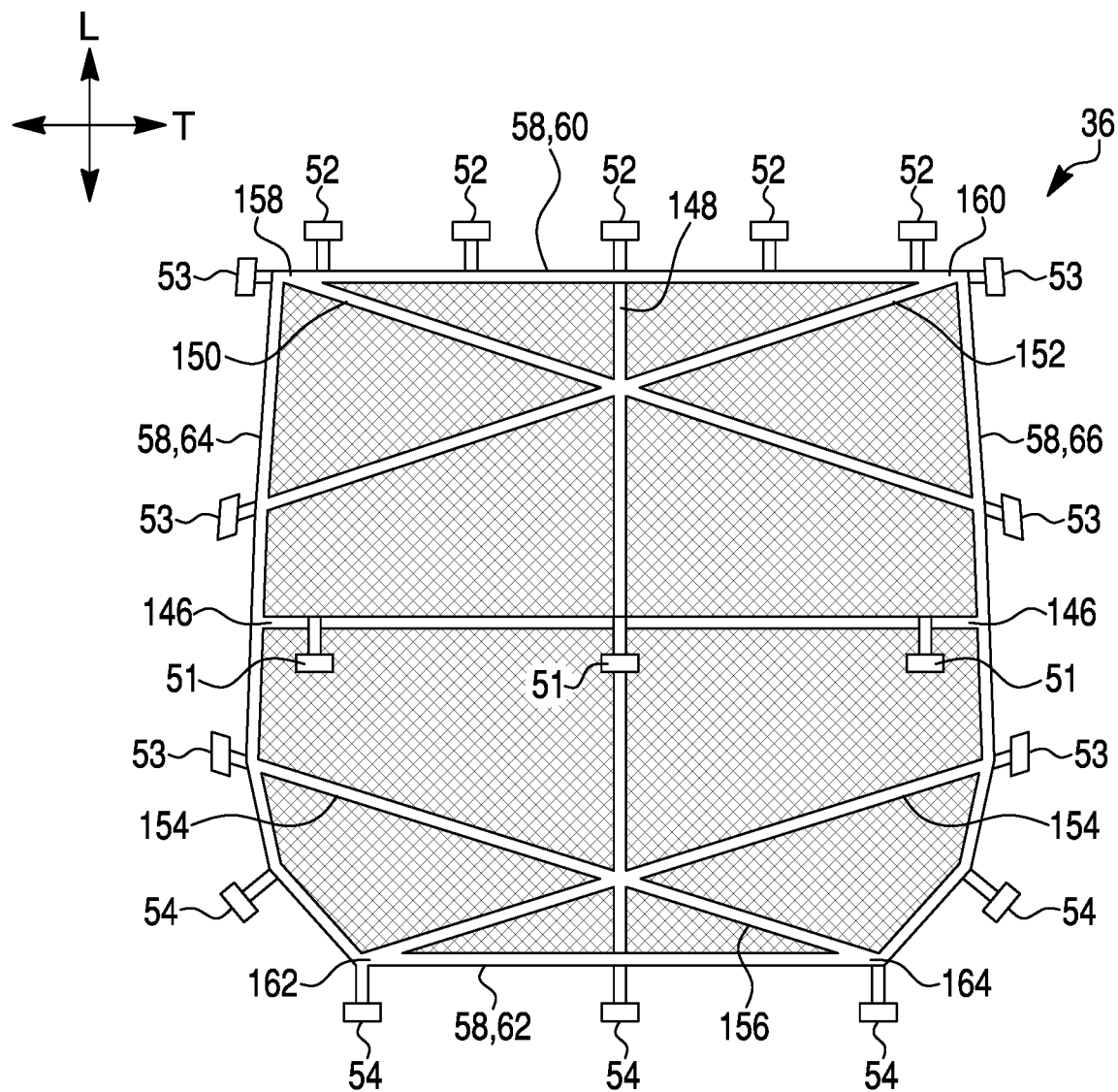
FIG. 3 is a plan view of the exemplary sunshade of the vehicle of FIG. 1, and schematically illustrates a plurality of anchors.

Referring to FIGS. 2 and 3, the sunshade 36 can include a flexible panel 50 and a plurality of anchors 51, 52, 53, 54. FIG. 3 schematically illustrates the anchors 51, 52, 53, 54. Further details of each of the anchors 51, 52, 53, 54 will be discussed below with reference to FIGS. 4-10, including how the anchors 51, 52, 53, 54 can be connected to the flexible panel 50.

The flexible panel 50 can include a fabric panel 56 and a reinforcing frame 58. The fabric panel 56 can be made from a mesh fabric such as but not limited to a plastic mesh fabric. The density or size of the openings through the fabric panel 56 can be predetermined such that the fabric panel 56 can obstruct at least a portion of the ambient sunlight while also appearing at least semi-transparent to the passenger(s). The reinforcing frame 58 can be made from any appropriate flexible material. The reinforcing frame 58 can be connected to the fabric panel 56 in any appropriate manner such as stitching, adhesives, separate connectors, etc. In the exemplary embodiment, the reinforcing frame can include a plurality of flexible woven material strips and the perimeter of the fabric panel 56 can be sewn to the strips of the reinforcing frame 58. In this exemplary embodiment, each pair of opposing woven material strips can be stitched to the fabric panel 56 and to each other.

The flexible panel 50 can include a front end 60, a rear end 62, a first side 64 and a second side 66. The flexible panel 50 can include an intermediate portion that is spaced away from each of the front end 60 and the rear end 62. The reinforcing frame 58 can include the front end 60, a rear end 62, a first side 64 and a second side 66.

As shown FIGS. 2 and 3, the sunshade 36 can include a plurality of middle anchors 51 connected the center crossbar 42 at locations that are spaced apart, a plurality of front anchors 52 connected to the front crossbar 40 at locations that are spaced apart, a plurality of side anchors 53 connected to each of the side bars 46, 48 at locations that are spaced apart, and a plurality of rear anchors 54 connected to the rear crossbar 44 at locations that are spaced apart.

Figure 4:
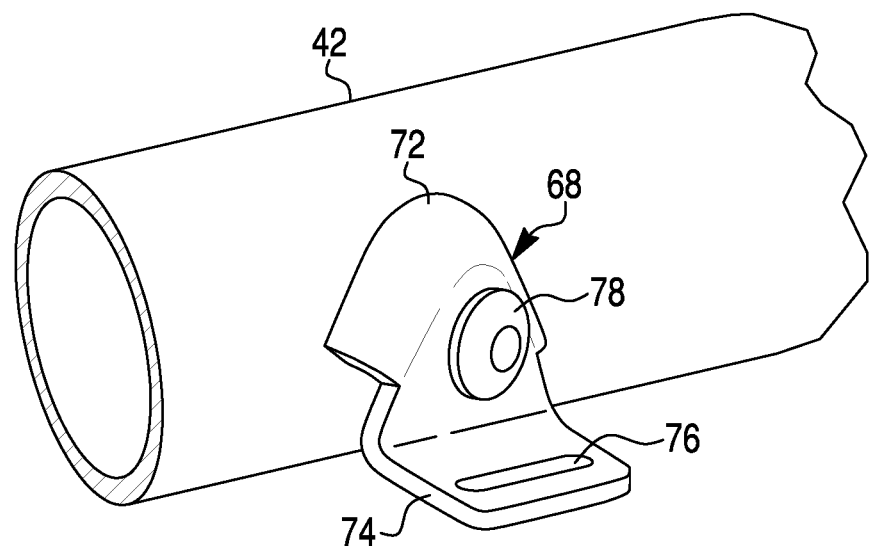
FIG. 4 is partial perspective view of a first exemplary anchor mounted onto a first exemplary frame member of the frame and sunshade assembly of FIG. 2.
Figure 5:
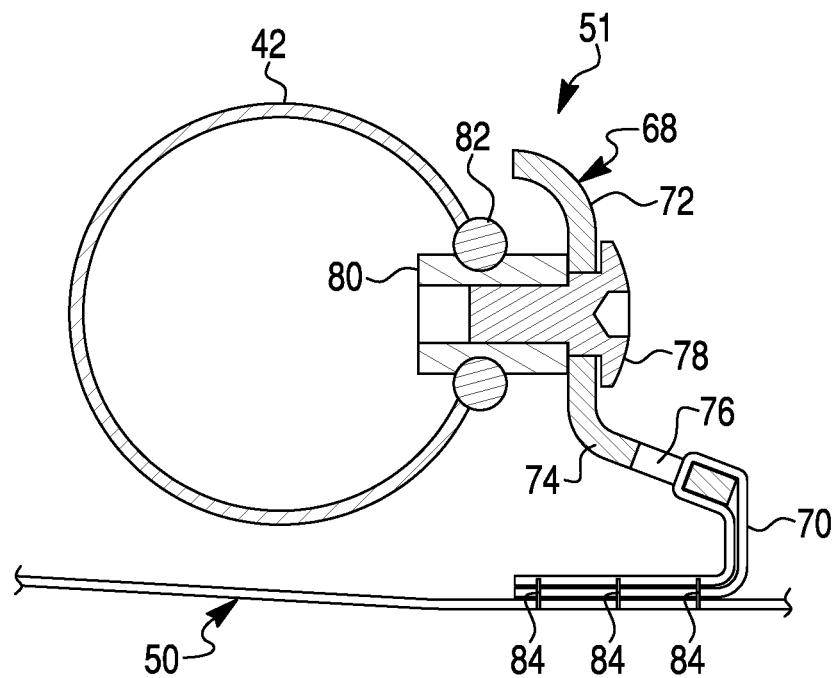
FIG. 5 is cross-sectional view taken along line 5-5 of FIG. 2.

Referring to FIGS. 4 and 5, each of the middle anchors 51 can include a bracket 68 and a strap 70. The flexible panel 50 and the strap 70 are omitted from FIG. 4 for simplicity and clarity of the drawing.

The bracket 68 can include a base 72, a flange 74 and an opening 76. The base 72 can include a bolt hole through which a bolt 78 can pass. The center crossbar 42 can include a threaded fastener such as a nut or a threaded collar 80 connected to the center crossbar 42 by a weld 82.

The strap 70 can be connected to each of the flexible panel 50 and the bracket 51 in any appropriate manner. For example, the strap 70 can be a flexible strap that is threaded through the opening 76 and wrapped around the flange 74 of the bracket 68. The free ends of the first strap 70 can be connected by a stitched pattern 84 onto the flexible panel 50 such that the strap 70 includes a loop through which a portion of the flange 74 extends.

Figure 6:
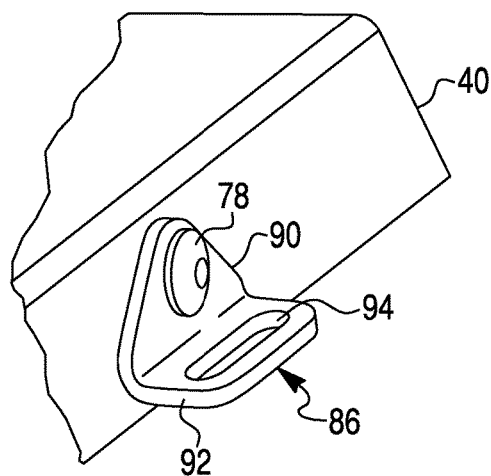
FIG. 6 is partial perspective view of a second exemplary anchor mounted onto a second exemplary frame member for use with the sunshade of FIG. 2.
Figure 7:
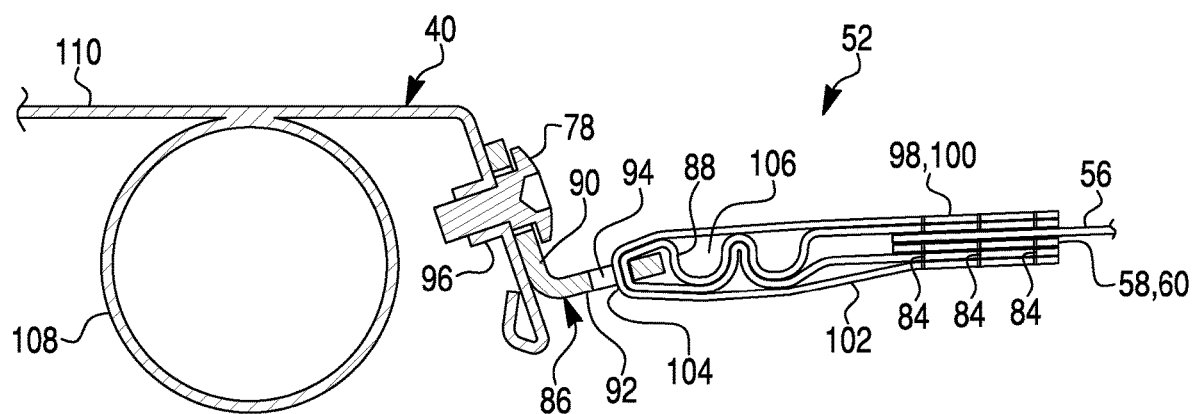
FIG. 7 is cross-sectional view taken along line 7-7 of FIG. 2.

Referring to FIGS. 6 and 7, each of the front anchors 52 can include a bracket 86 and an elastic strap 88. The flexible panel 50 and the elastic strap 88 are omitted from FIG. 6 for simplicity and clarity of the drawing.

The bracket 86 can include a base 90, a flange 92 and an opening 94. The base 90 can include a bolt hole through which a bolt 78 can pass. The front crossbar 40 can include a threaded fastener such as a nut or a threaded collar 96 connected to the front crossbar 40 in any appropriate manner such as but not limited to adhesive or welding.

The elastic strap 88 can be connected to each of the flexible panel 50 and the bracket 86 in any appropriate manner. For example, the elastic strap 88 can be threaded through the opening 94 in the bracket 86 and wrapped around the flange 92. The free ends of the elastic strap 88 can be connected by a stitched pattern 84 onto the front end of the reinforcing frame 58 such that the elastic strap 88 includes a loop through which a portion of the flange 92 extends. The elastic strap 88 can include a predetermined elasticity such that each of the elastic straps 88 can apply a predetermined tension to the flexible panel 50 between the front anchors 52 and the middle anchors 51 when the sunshade 36 is secured to the frame members 40, 42, 44, 46, 48.

Each of the front anchors 52 can include a cover 98 connected to the bracket 86. The cover 98 can include a first side 100, a second side 102, a base 104 and a space 106 bounded by the first side 100, the second side 102 and the base 104. The base 104 can pass through the opening 94 in the bracket 86 and engage the flange 92. The elastic strap 88 can extend into the space 106.

The front crossbar 40 can include a hollow tube 108 and a visor 110. The hollow tube 108 and the visor 110 can be made from any appropriate material such as but not limited to metal, plastic, carbon fiber, fiberglass, fiber-reinforced plastic or any combination of these materials. The visor 110 can be secured to the hollow tube 108 in any appropriate manner such as but not limited to threaded fasteners, rivets, adhesive, welds, etc.

Referring to FIG. 7, the bolt 78 and the bracket 86 can be oriented relative to the stretching direction of the elastic strap 88 such that elastic strap 88 stretches as the bolt 78 is tightened. This can simplify installation in contrast to an alternate installation procedure in which the installer stretches the elastic strap 88 by one hand while simultaneously installing the bolt 78 with the other hand.

Figure 8:
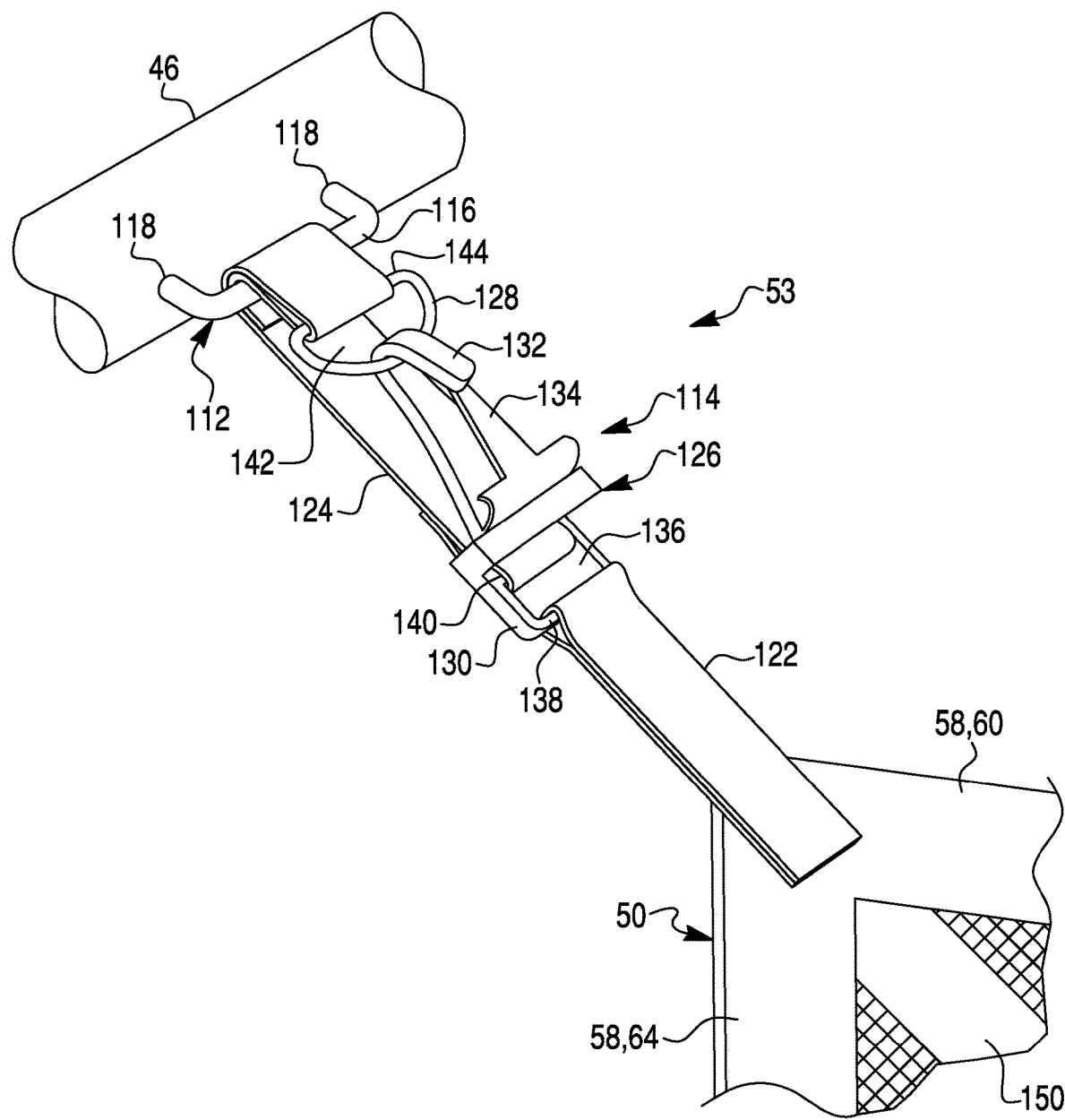
FIG. 8 is a perspective view of a third exemplary anchor mounted onto the exemplary frame member indicated by arrow 8 in FIG. 2.
Figure 11:
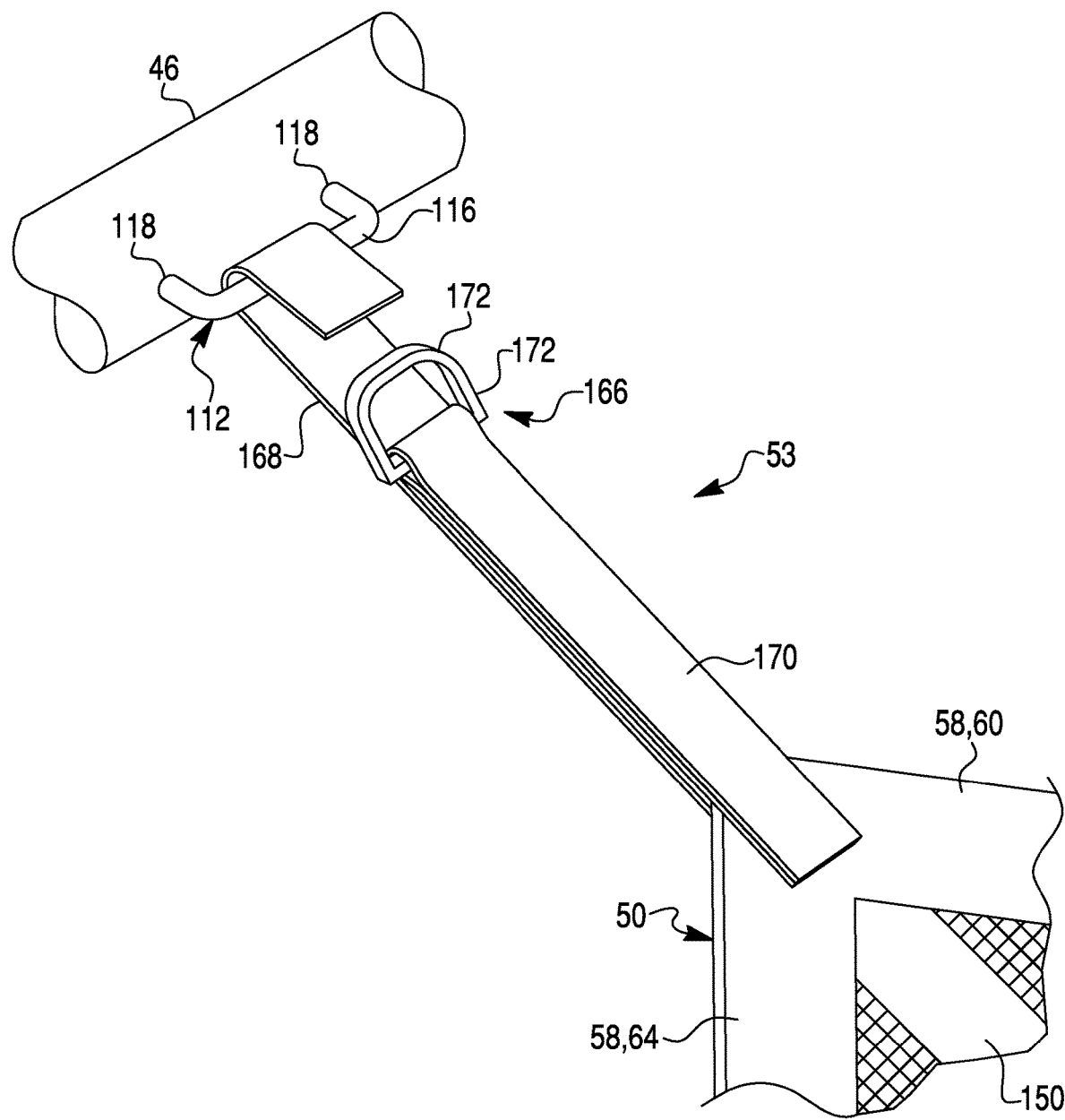
FIG. 11 is a perspective view of an alternate embodiment of the third exemplary anchor for use with the sunshade of FIG. 2.
Figure 12:
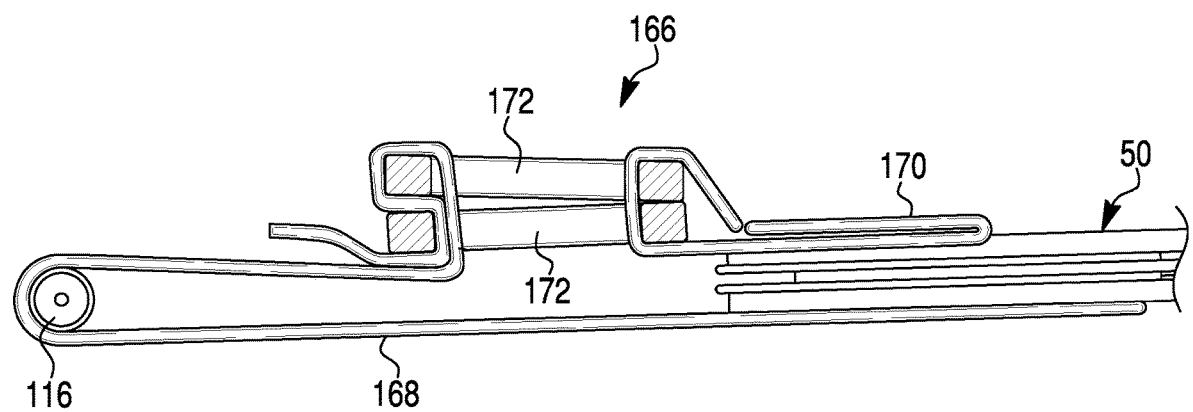
FIG. 12 is a cross-sectional view of a portion of FIG. 11.

Referring to FIGS. 8, 11 and 12, each of the side anchors 53 can include a bracket 112 and a D-ring assembly. The D-ring assembly can be configured to selectively engage and disengage the frame assembly 32. The D-ring assembly can be configured to adjust the tension in the flexible panel 50 when the sunshade 36 is connected to the frame assembly 32. The D-ring assembly can be configured as a hook and D-ring assembly 114 shown in FIG. 8 or as a strap and D-ring assembly shown in FIGS. 11 and 12.

Each of the brackets 112 can have a U-shape and can include a base 116 and a pair of legs 118. Each end of the legs 118 can be mounted onto a respective one of the side bars 46, 48. The brackets 112 can be connected to the side bars 46, 48 in any appropriate manner such as but not limited to threaded fasteners, adhesives or welds. The legs 118 can locate the base 116 away from the rear crossbar 44 to create a space 120 through which a portion of the hook and D-ring assembly 114 can pass.

Referring to FIG. 8, the hook and D-ring assembly 114 can include a first strap 122, a second strap 124, a hook 126 and a D-ring 128.

The hook 126 can include a base ring 130, a hook member 132 and a biased latch 134. The base ring 130 can surround an opening 136 and can include a first side 138 and a second side 140. The hook member 132 can be secured to the base ring 130 in any appropriate manner. The biased latch 134 can be pivotally mounted on either the ring base 130 or the hook member 132. The biased latch 134 can be biased into engagement with the hook member 132.

The first strap 122 can be connected to each of the hook 126 and the flexible panel 50. For example, the first strap 122 can be a flexible strap that is threaded through the opening 136 and wrapped around a first side 138 of the base ring 130. The free ends of the first strap 122 can be stitched together and onto the reinforcing frame 58 such that the first strap 122 includes a loop through which the first side 138 of the ring base 130 extends.

The second strap 124 can be connected to each of the hook 126 and the D-ring 128. For example, the second strap 124 can be a flexible strap with a first free end of the second strap 124 threaded through the opening 136 and wrapped around a second side 140 of the base ring 130. The first free end of the second strap 122 can be stitched onto an intermediate portion of the second strap 124 such that the second strap 124 includes a loop through which the second side 140 of the ring base 130 extends. A second end of the second strap can be threaded through the opening 142 in the D-ring 128 and wrapped around the side 144 of the D-ring 128. The second end of the second strap 124 can be stitched onto an intermediate portion of the second strap 124 such that the second strap 124 includes a loop through which the side 144 of the D-ring 128 extends.

During assembly of the sunshade 36, the D-ring 128 can pass through the space between the base 116 of the bracket 112 and the respective one of the side bars 46, 48 such that the second strap wraps around the base 116 of the bracket 112. After the second strap 124 passes between the base 116 and the respective one of the side bars 46, 48, the hook 132 can pass through the opening 142 in the D-ring 128, as shown in FIG. 8.

Figure 9:
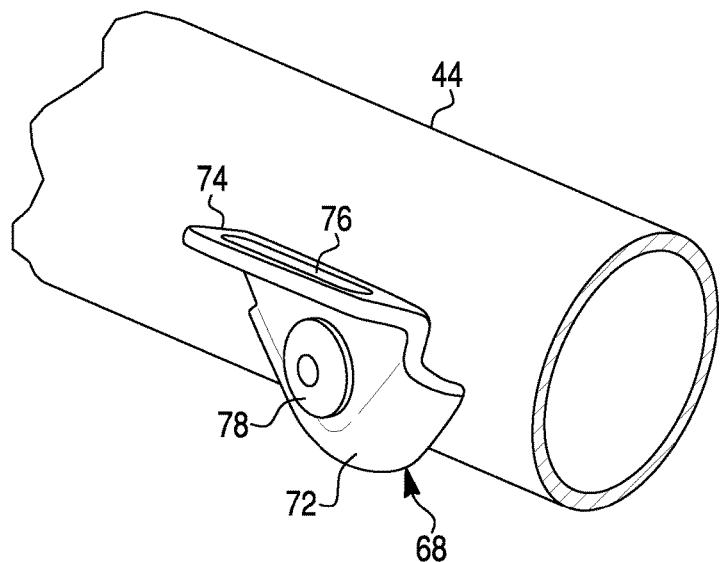
FIG. 9 is partial perspective view of a fourth exemplary anchor mounted onto a fourth exemplary frame member for use with the sunshade of FIG. 2.
Figure 10:
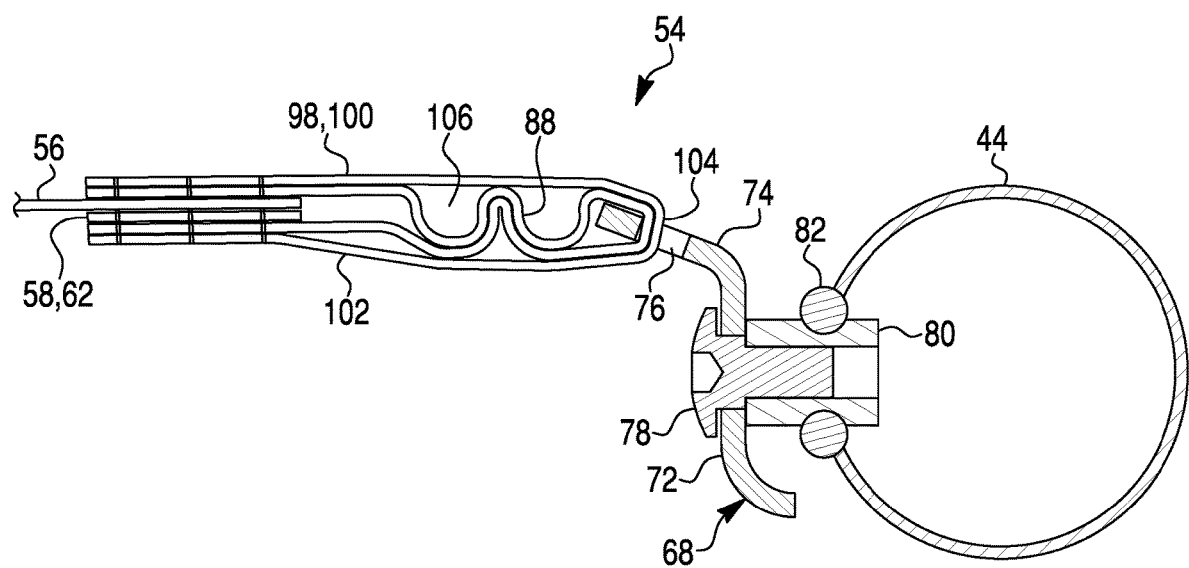
FIG. 10 is cross-sectional view taken along line 10-10 of FIG. 2.

Referring to FIGS. 9 and 10, each of the rear anchors 54 can include a bracket 68 as described above with respect to FIGS. 4 and 5 and an elastic strap 88 as described above with respect to FIGS. 6 and 7. The flexible panel 50 and the elastic strap 88 are omitted from FIG. 9 for simplicity and clarity of the drawing.

As shown in FIGS. 9 and 10, the bracket 68 can be inverted with respect to the orientation shown in FIGS. 4 and 5. The bracket 68 can include a base 72, a flange 74 and an opening 76. The base 72 can include a bolt hole through which a bolt 78 can pass. The rear crossbar 44 can include a threaded fastener such as a nut or a threaded collar 80 connected to the rear crossbar 44 by a weld 82.

The elastic strap 88 can be connected to each of the flexible panel 50 and the bracket 68 in any appropriate manner. For example, the elastic strap 88 can be threaded through the opening 76 in the bracket 68 and wrapped around the flange 74. The free ends of the elastic strap 88 can be connected by a stitched pattern 84 onto the rear end of the reinforcing frame 58 such that the elastic strap 88 includes a loop through which a portion of the flange 74 extends. The elastic strap 88 can include a predetermined elasticity such that each of the elastic straps 88 can apply a predetermined tension to the flexible panel 50 between the front anchors 52 and the middle anchors 51 when the sunshade 36 is secured to the frame members 40, 42, 44, 46, 48.

Each of the rear anchors 54 can include a cover 98 connected to the bracket 68. The cover 98 can include a first side 100, a second side 102, a base 104 and a space 106 bounded by the first side 100, the second side 102 and the base 104. The base 104 can pass through the opening 94 in the bracket 86 and engage the flange 92. The elastic strap 88 can extend into the space 106.

Referring to FIG. 10, the bolt 78 and the bracket 86 can be oriented relative to the stretching direction of the elastic strap 88 such that elastic strap 88 stretches as each bolt 78 is tightened. This can simplify installation in contrast to an alternate installation procedure in which the installer stretches the elastic strap 88 by one hand while simultaneously installing the bolt 78 with the other hand.

FIGS. 11 and 12 show an alternate embodiment of the D-ring assembly of the side anchor 53. Instead of the plurality of the hook and D-ring assemblies 114, the side anchors 53 can include a plurality of strap and D-ring assemblies 166. Each strap and D-ring assembly 166 can include a connector strap 168, a ring strap 170 and a pair of D-rings 172.

The connector strap 168 can have a first end connected to the flexible panel 50 at the reinforcing frame 58 and a second end that is selectively wrapped around the bracket 112 and through and around each of the D-rings 172. FIG. 11 shows the second end of the connector strap 168 before it has been threaded through the D-rings 172.

The ring strap 170 can be connected to each of the D-rings 172 and the flexible panel 50. For example, the ring strap 170 can be a flexible strap that is threaded through the opening of each D-ring 130. The free ends of the ring strap 170 can be stitched together and onto the reinforcing frame 58 such that the ring strap 170 includes a loop through which the D-rings 172 extend.

FIG. 12 shows the connector strap wrapped around the bracket 112 and threaded through the D-rings 172. After wrapping around the bracket 112, the connector strap 170 can be directed though both of the D-rings 172, and then looped back around the uppermost D-ring 172 as viewed in FIG. 12 and then through and around the lowermost D-ring 172 as viewed in FIG. 12 to provide a cinching type anchor. The adjustable connector 320 can be selectively tightened to provide a flat orientation for the flexible panel 50. In order to adjust or tighten the strap and D-ring assembly 166, the second end of the connector strap 170 can be pulled along its longitudinal axis to tighten the connection, or pushed back through the D-rings 172 to loosen the connection.

Thus, the bolts 78 and plurality of D-ring assemblies (114 or 166) can facilitate a simple assembly process for mounting the sunshade 36 onto the vehicle 10. Further, the bolts 78 and plurality of D-ring assemblies (114 or 166) can facilitate easy removal of the sunshade from the vehicle 10 for maintenance or replacement of sunshade 36.

Referring to FIG. 3, the flexible panel 50 can include a plurality of reinforcing strips 146, 148, 150, 152, 154, 156 that span respective portions of the flexible panel 50. The anchors 51, 52, 53, 54 can be connected to the reinforcing frame 58 and the reinforcing strips 146, 148, 150, 152, 154, 156. The reinforcing frame 58 and the reinforcing strips 146, 148, 150, 152, 154, 156 can distribute the tension applied by the elastic straps 88 and the tension applied by the hook and D-ring assemblies throughout the flexible panel 50 so that the flexible panel 50 is pulled taught when connected to the frame members 40, 42, 44, 46, 48. Thus, further adjustment to the sunshade 36 can be avoided after the sunshade 36 is mounted onto the vehicle 10.

The middle reinforcing strip 146 can extend along the intermediate portion of the flexible panel 50. The middle reinforcing strip 146 can be spaced away from each of the front end 60 and the rear end 62 of the flexible panel 50. The middle reinforcing strip 146 can extend along the transverse direction T of the vehicle 10 and intersect the center reinforcing strip 148, such as in a perpendicular manner with respect to each other. The middle reinforcing strip 146 can be connected to the reinforcing frame 58 at the first side 64 and the second side 66.

Each of the middle anchors 51 can be connected to the flexible panel 50 at the middle reinforcing strip 146. One of the middle anchors 51 can be connected at the intersection of the middle reinforcing strip 146 and the center reinforcing strip 148. The other middle anchors 51 can be connected to the middle reinforcing strip 146 at locations on the middle reinforcing strip 146 that are spaced away from the first and second sides 64, 66 of the flexible panel 50 along the transverse direction T of the vehicle 10.

The center reinforcing strip 148 can be spaced way from each of the first side 64 and the second side 66 of the flexible panel 50. The center reinforcing strip 148 can extend along the longitudinal direction L of the vehicle 10. The center reinforcing strip 148 can be connected to the reinforcing frame 58 at the front end 60 and the rear end 62 of the flexible panel 50. One of the front anchors 52 can be connected to the front end 60 of the flexible panel 50 at or adjacent to the intersection of the reinforcing frame 58 and the center reinforcing strip 148. One of the rear anchors 54 can be connected to the rear end 62 of the flexible panel 50 at or adjacent to the intersection of the reinforcing frame 58 and the center reinforcing strip 148.

A first corner 158 can join the first side 64 and the front end 60 of the flexible panel 50. The first diagonal reinforcing strip 150 can be connected to the reinforcing frame 58 at each of the first corner 158 and the second side 66 of the flexible panel 50. The first diagonal reinforcing strip 150 can be connected to the reinforcing frame 58 at a location on the second side 66 of the flexible panel 50 that is between each of the front end 60 and middle reinforcing strip 146. One of the side anchors 53 can be connected to the reinforcing frame 58 at the first corner 158. One of the side anchors 53 can be connected to the second side 66 at the intersection of the reinforcing frame 58 and the first diagonal reinforcing strip 150.

A second corner 160 can join the second side 66 and the front end 60 of the flexible panel 50. The second diagonal reinforcing strip 152 can be connected to the reinforcing frame 58 at each of the second corner 160 and the first side 64 of the flexible panel 50. The second diagonal reinforcing strip 160 can be connected to the reinforcing frame 58 at a location on the first side 64 of the flexible panel 50 that is between each of the front end 60 and middle reinforcing strip 146. One of the side anchors 53 can be connected to the reinforcing frame 58 at the second corner 160. One of the side anchors 53 can be connected to the first side 64 at the intersection of the reinforcing frame 58 and the second diagonal reinforcing strip 152.

A third corner 162 can join the first side 64 and the rear end 62 of the flexible panel 50. The third diagonal reinforcing strip 154 can be connected to the reinforcing frame 58 at each of the third corner 162 and the second side 66 of the flexible panel 50. The third diagonal reinforcing strip 154 can be connected to the reinforcing frame 58 at a location on the second side 66 of the flexible panel 50 that is between each of the rear end 62 and the middle reinforcing strip 146. One of the rear anchors 154 can be connected to the reinforcing frame 58 at the third corner 162. One of the side anchors 53 can be connected to the reinforcing frame 58 at the intersection of the reinforcing frame 58 and the third diagonal reinforcing strip 154.

A fourth corner 164 can join the second side 66 and the rear end 62 of the flexible panel 50. The fourth diagonal reinforcing strip 156 can be connected to the reinforcing frame 58 at each of the fourth corner 164 and the first side 64 of the flexible panel 50. The fourth diagonal reinforcing strip 156 can be connected to the reinforcing frame 58 at a location on the first side 64 of the flexible panel 50 that is between each of the rear end 62 and the middle reinforcing strip 146. One of the rear anchors 154 can be connected to the reinforcing frame 58 at the third corner 162. One of the side anchors 53 can be connected to the reinforcing frame 58 at the intersection of the reinforcing frame 58 and the fourth diagonal reinforcing strip 156.

One of the rear anchors 54 can be connected to reinforcing frame 58 along the first side 64 at a location between the third corner 162 and the intersection of the reinforcing frame 58 and the fourth diagonal reinforcing strip 156. One of the rear anchors 54 can be connected to reinforcing frame 58 along the second side 66 at a location between the third corner 162 and the intersection of the reinforcing frame 58 and the third diagonal reinforcing strip 154.

Thus, the exemplary sunshade 36 can at least partially shield one or more passengers of a vehicle 10 from one or more ambient conditions, while simultaneously providing the passenger(s) with sense of an open passenger space. Further, the anchors 51, 52, 53, 54 can facilitate installation of the sunshade 36 onto the vehicle 10 and can hold the flexible panel 56 taut during operation of the vehicle 10 without further adjustment once the sunshade is mounted onto the vehicle 10. Further still, the bolts 78 and plurality of hook and D-ring assemblies 112 can facilitate easy removal of the sunshade from the vehicle 10 for maintenance or replacement of sunshade 36.

While certain embodiments of the invention are described above, it should be understood that the invention can be embodied and configured in many different ways without departing from the spirit and scope of the invention.

For example, embodiments are disclosed above in the context of a semi-transparent sunshade. However, embodiments are intended to include or otherwise cover any type of sunshade. For example, the flexible panel 50 can be made from any appropriate material that may or may not appear to be transparent or semi-transparent to a passenger of the vehicle 10 such as but not limited to canvas, solid nylon fabric, metal wire mesh, etc.

The sunshade 36 can extend above the center crossbar 42 in the vertical direction V of the vehicle 10, as shown in FIG. 1. Alternatively, as shown in FIG. 2, the sunshade 36 can extend below the center crossbar 42 with respect to the vertical direction V of the vehicle 10.

FIGS. 7 and 10 show the free ends of the elastic strap 88 as being stitched onto opposite sides of the reinforcing frame 58. However, alternate embodiments can include the free ends of the elastic strap 88 stitched onto the same side of the reinforcing frame 58.

An alternate embodiment can omit the brackets 112 of the side anchors 53. In this alternate embodiment, the second strap 124 can be wrapped around a respective one of the side bars 46, 48.

Alternate embodiments can omit the diagonal reinforcing strips 150, 152, 154, 156 from the flexible panel 50 such that the fabric panel 56 is framed in four sections divided by the middle reinforcing strip 146 and the center reinforcing strip 148.

Alternate embodiments can replace the first and second diagonal reinforcing strips 150, 152 with a single transverse strip that is located between the front end 60 of the flexible panel 50 and the middle reinforcing strip 146. Alternate embodiments can replace the third and fourth diagonal reinforcing strips 154, 156 with a single transverse strip that is located between the rear end 62 and the middle reinforcing strip 146.

Alternative embodiments can omit the visor 110 from the front crossbar 40. Alternative embodiments can include the nut or threaded collar mounted on the hollow tube 108 instead on the visor 110 of the front crossbar 40.

It should be noted that the various straps described above as flexible may or may not also be elastic. In general, where a strap is described as flexible, it has less elasticity than a strap that is described as an elastic strap.

However, the above alternative embodiments are merely provided for exemplary purposes, and as indicated above.

What is claimed is:

1. A sunshade for a vehicle including a passenger space, a center frame member, a front crossbar, a rear crossbar, a center crossbar, a first side bar, and a second side bar, the crossbars and the side bars connected together and extending around the passenger space, the sunshade comprising:
    a flexible panel configured to extend across an area bounded by the front crossbar, the rear crossbar, the first side bar and the second side bar, and the flexible panel includes a front end, a rear end opposing the front end, and an intermediate portion located between the front end and the rear end;
    a middle anchor connected to the intermediate portion of the flexible panel and configured to be bolted onto the center crossbar;
    a front anchor configured to be bolted onto the front crossbar, the front anchor includes a front elastic member connected to the flexible panel;
    a first side anchor configured to be mounted onto the first side bar, the first side anchor includes a first D-ring assembly connected to the flexible panel;
    a rear anchor configured to be bolted onto the rear crossbar, the rear anchor includes a rear elastic member connected to the flexible panel; and
    a second side anchor configured to be mounted onto the second side bar, the second side anchor includes a second D-ring assembly connected to the flexible panel, and
    the front elastic member and the rear elastic member are configured to apply tension to the flexible panel when the flexible panel is mounted onto each of the center crossbar, the front crossbar, rear crossbar, first side bar, and second side bar.

2. The sunshade according to claim 1, wherein
    each of the front and rear anchors includes a bracket configured to be bolted onto the respective one of the front and rear crossbars,
    each of the front and rear elastic members is an elastic strap that includes a first end and a second end, the elastic strap is folded onto itself to form a loop and the first and second ends of the elastic strap are connected to the flexible panel,
    the bracket of the front anchor passes through the loop of the front elastic member, and
    the bracket of the rear anchor passes through the loop of the rear elastic member.

3. The sunshade according to claim 2, wherein
    the front anchor includes a front cover including a recess into which the front elastic member extends; and
    the rear anchor includes a rear cover including a recess into which the rear elastic member extends.

4. The sunshade according to claim 1, wherein
    the front anchor includes a front bracket that is configured to be bolted to the front crossbar, the front bracket has an opening, and the front elastic member includes a first end connected to the flexible panel, and a second end that passes through the opening in the front bracket, and
    the rear anchor includes a rear bracket that is configured to be bolted to the rear crossbar, the rear bracket has an opening, and the rear elastic member includes a first end connected to the flexible panel, and a second end that passes through the opening in the rear bracket.

5. The sunshade according to claim 1, wherein
    the first side anchor includes a first bracket configured to be bolted onto the first side bar,
    the second side anchor includes a second bracket configured to be bolted onto the second side bar,
    each of the first and second D-ring assemblies includes a hook, a first strap connected to each of the hook and the flexible panel, a D-ring, and a second strap connected to each of the hook and the D-ring,
    the second strap of the first D-ring assembly engages the first bracket and the first hook engages the D-ring when the first D-ring assembly is connected to the first bracket, and
    the second strap of the second D-ring assembly engages the second bracket and the hook of the second D-ring assembly engages the D-ring when the second D-ring assembly is connected to the second side anchor.

6. The sunshade according to claim 1, wherein
    the flexible panel includes a first side and a second side, the first side is connected to and extends from the front end and the rear end of the flexible panel, the second side is connected to extends from the front end and the rear end of the flexible panel, and the first side is spaced away from the second side,
    the first D-ring assembly is connected to the first side of the flexible panel, and
    the second D-ring assembly is connected to the second side of the flexible panel.

7. The sunshade according to claim 6, wherein
    the flexible panel includes a center reinforcing strip that extends from the first side to the second side, and the center reinforcing strip is spaced away from each of the front end and the rear end of the flexible panel, and
    the middle anchor is connected to the center reinforcing strip.

8. The sunshade according to claim 7, further comprising a middle reinforcing strap intersecting the center reinforcing strip, and the middle anchor is connected to the middle reinforcing strap where the middle reinforcing strip intersects the center reinforcing strip.

9. The sunshade according to claim 1, wherein the flexible panel includes a mesh fabric and a flexible reinforcing frame connected to and encircling the mesh fabric.

10. The sunshade according to claim 1, wherein each of the first side anchor and the second side anchor is configured to be bolted onto the first side bar and the second side bar, respectively.

11. The sunshade according to claim 1, further comprising a plurality of each of the middle anchor, the front anchor, the rear anchor, first side anchor and the second side anchor.

12. The sunshade according to claim 1, further comprising:
   a third anchor configured to be bolted onto the rear crossbar, the third anchor includes a third elastic member connected to the flexible member;
   a fourth anchor configured to be bolted onto the rear crossbar, the fourth anchor includes a fourth elastic member connected to the flexible member,
   the rear elastic member is configured to apply tension to the flexible panel in a first direction when the flexible panel is mounted onto each of the center crossbar, the front crossbar, the rear crossbar, the first side bar, and second side bar,
   the third elastic member is configured to apply tension to the flexible panel in a second direction when the flexible panel is mounted onto each of the center crossbar, the front crossbar, the rear crossbar, the first side bar, and second side bar, and the second direction intersects the first direction, and
   the fourth elastic member is configured to apply tension to the flexible panel in a third direction when the flexible panel is mounted onto each of the center crossbar, the front crossbar, the rear crossbar, the first side bar, and second side bar, and the third direction intersects each of the first direction and the second direction.

13. The sunshade according to claim 1, wherein the flexible panel includes,
   a reinforcing frame extending around the perimeter of the flexible panel, the reinforcing frame includes the front end, the rear end, a first side and a second side, the first side is connected to and extends from the front end and the rear end of the flexible panel, the second side is connected to and extends from the front end and the rear end of the flexible panel, and the first side is spaced away from the second side,
   a middle reinforcing strip extending along the intermediate portion of the flexible panel and spaced away from each of the front end and the rear end of the flexible panel, the middle reinforcing strip intersects the center reinforcing strip and is connected to the reinforcing frame at the first side and the second side,
   a center reinforcing strip spaced way from each of the first side and the second side and connected to the reinforcing frame at the front end and the rear end of the flexible panel,
   a front corner joining the first side and the front end of the flexible panel,
   a rear corner joining the first side and the rear end of the flexible panel,
   the middle anchor is connected to the middle reinforcing strip at the center reinforcing strip,
   the front elastic member is connected to the reinforcing frame at the center reinforcing strip,
   the first D-ring assembly is connected to the first side of the reinforcing frame at the front corner,
   the rear elastic member is connected to the reinforcing frame at the center reinforcing strip, and
   the second D-ring assembly is connected to the second side of the reinforcing frame.

14. An off-road vehicle comprising:
   a passenger space including at least a first seat and a second seat arranged side-by-side in a transverse direction of the vehicle;
   a rollover protection structure surrounding the passenger space and including,
      a front crossbar extending along the transverse direction of the vehicle,
      a rear crossbar extending along the transverse direction of the vehicle and spaced away from the front crossbar along a longitudinal direction of the vehicle,
      a center crossbar extending along the transverse direction of the vehicle and located between the front crossbar and the rear crossbar,
      a first side bar extending along the longitudinal direction of the vehicle, the first side bar is connected to each of the front, rear and center crossbars, and
      a second side frame member extending along the longitudinal direction of the vehicle, the second side bar is spaced away from the first side frame member in the transverse direction of the vehicle, and the second side bar is connected to each of the front, rear and center crossbars; and
   a sunshade covering an area that overlaps the passenger space and including,
      a flexible panel configured to extend along an area bounded by the rollover protection structure, and the flexible panel includes a front end extending along the transverse direction of the vehicle, a rear end extending along the transverse direction of the vehicle and spaced away from the front end in the longitudinal direction of the vehicle, a first side extending from and connected to each of the front end and the rear end, and a second side extending from and connected to each of the front end and the rear end;
      a middle anchor connected to the flexible panel at a location that is spaced away from each of the front end and the rear end of the flexible panel, the middle anchor is bolted onto the center frame member;
      a front anchor bolted onto the front frame member, the front anchor includes a front elastic member connected to the flexible panel;
      a first side anchor mounted onto the first side frame member, the first side anchor includes a first D-ring assembly connected to the first side of the flexible panel;
      a rear anchor bolted onto the rear frame member, the rear anchor includes a rear elastic member connected to the flexible panel; and
      a second side anchor mounted onto the second side frame member, the second side anchor includes a second D-ring assembly connected to the flexible panel, and
      the front elastic member and the rear elastic member apply tension to the flexible panel.

15. The off-road vehicle according to claim 14, wherein the front anchor and the rear anchor are oriented relative to a predetermined direction such that the front and rear elastic members are elastically deformed when bolts that connect the front and rear anchors to the front and rear frame members, respectively, are tightened in the front and rear frame members.

16. The off-road vehicle according to claim 14, wherein the flexible panel includes a middle reinforcing strip extending along the transverse direction of the vehicle from the first side to the second side of the flexible panel, and the middle anchor is connected to the middle reinforcing strip at a location that is spaced away from each of the first side and the second side.

17. The off-road vehicle according to claim 14, wherein the first side anchor includes a first bracket mounted on the first side frame member, the second side anchor includes a bracket mounted on the second side frame member, each of the first and second D-ring assemblies includes a connector strap connected to and extending away from the flexible panel, a ring strap connected to the flexible panel, and a pair of D-rings connected to the ring strap, and the connector strap wraps around a respective one of the first and second brackets and extends around and through each of the D-rings.

18. The off-road vehicle according to claim 14, wherein a rear corner joins the first side and the rear end of the flexible panel, the flexible panel includes a rear diagonal reinforcing strip extending from each of the rear corner and the second side of the flexible panel, the rear diagonal reinforcing strip is connected to the second side of the flexible panel at a location that is spaced away from each of the front end and the rear end, the rear elastic member is connected to the rear diagonal reinforcing strip at the rear corner, and the second D-ring assembly is connected to the rear diagonal reinforcing strip at the second side of the flexible panel.

19. The off-road vehicle according to claim 14, wherein the sunshade includes a plurality of each of the front anchor, the front elastic member, the rear anchor, and the rear elastic member, one of the front elastic members is aligned with one of the rear elastic members in the longitudinal direction of the vehicle, and each of a full remainder of the rear elastic members is misaligned with each of a full remainder of the front elastic members with respect to the longitudinal direction of the vehicle.

20. A frame and sunshade assembly for a vehicle having a passenger space configured in a side-by-side seating arrangement, the frame and sunshade assembly comprising:

a plurality of frame members connected together to define an area above the passenger space when the frame members are mounted on the vehicle;

a flexible panel extending along the area; and a plurality of anchors connected to the flexible panel, each of the anchors is mounted onto a respective one of the frame members, the anchors include, a first flexible strap, a second elastic strap, a pair D-ring assemblies, and a fourth elastic strap.

* * * * *